US012617708B2

(12) United States Patent
Watanabe et al.

(10) Patent No.: US 12,617,708 B2
(45) Date of Patent: May 5, 2026

(54) METHOD FOR MANUFACTURING OPTICAL FIBER

(71) Applicant: SUMITOMO ELECTRIC INDUSTRIES, LTD., Osaka (JP)

(72) Inventors: Yudai Watanabe, Osaka (JP); Kazuyuki Sohma, Osaka (JP); Tatsuya Konishi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 316 days.

(21) Appl. No.: 18/581,613

(22) Filed: Feb. 20, 2024

(65) Prior Publication Data

US 2024/0294418 A1 Sep. 5, 2024

(30) Foreign Application Priority Data

Feb. 24, 2023 (JP) ................................. 2023-027508

(51) Int. Cl.
*G02B 6/02* (2006.01)
*C03B 37/027* (2006.01)

(52) U.S. Cl.
CPC .... *C03B 37/02727* (2013.01); *G02B 6/02395* (2013.01)

(58) Field of Classification Search
CPC ..................... C03B 37/02727; G02B 6/02395; G02B 6/02; C03C 25/105; C03C 25/1065; C03C 25/465; C03C 25/50
See application file for complete search history.

(56) References Cited

U.S. PATENT DOCUMENTS

| 11,372,155 | B2 * | 6/2022 | Tachibana | ................. C08F 2/44 |
| 12,054,629 | B2 * | 8/2024 | Hamakubo | .............. C03C 3/06 |
| 2021/0188705 | A1 * | 6/2021 | Hamakubo | ............. C03C 25/42 |

FOREIGN PATENT DOCUMENTS

JP 2017-065949 A 4/2017

* cited by examiner

*Primary Examiner* — Jennifer Doan
(74) *Attorney, Agent, or Firm* — MCDONALD HOPKINS LLC

(57) ABSTRACT

A method for manufacturing an optical fiber including a glass fiber and a primary resin layer, the method includes: applying an ultraviolet curable resin composition; and forming the primary resin layer by curing the resin composition by ultraviolet irradiation reactor(s), wherein a number N of the ultraviolet irradiation reactor(s), a ratio of normalized output φ for each of the ultraviolet irradiation reactor(s), and an irradiation time t (sec) of each of the ultraviolet irradiation reactor(s) in the forming of the primary resin layer satisfy $6.00 \times 10^{-5} \leq N \ast \varphi \ast t \leq 2.88 \times 10^{-1}$, wherein a concentration C [mass %] of the photoinitiator in the forming of the primary resin layer is in accordance with formula (1):

$$C = C0 \ast \exp\left(-N \ast \varphi \ast \frac{l}{v} \ast k\right) \ast \exp\left(-N \ast \varphi \ast \frac{L}{v} \ast kD\right) + \qquad (1)$$
$$C0 \ast \left(1 - \exp\left(-\varphi \ast \frac{lk + LkD}{v}\right)\right) \ast$$
$$\left(1 - \left(1 + N \ast \frac{l}{v} \ast 4kR \ast C0 \ast \left(1 - \exp\left(-\varphi \ast \frac{lk + LkD}{v}\right)\right)\right)^{-1}\right)$$

wherein the initiation reaction rate constant k is from 20 to 100, wherein the dark reaction rate constant kD is $0 \leq kD \leq 30$, and wherein the reverse reaction rate constant kR is $0 \leq kR \leq 10$.

10 Claims, 2 Drawing Sheets

METHOD FOR MANUFACTURING OPTICAL FIBER

TECHNICAL FIELD

The present disclosure relates to a method for manufacturing an optical fiber. This application claims priority based on Japanese Patent Application No. 2023-027508 filed on Feb. 24, 2023, the entire contents of which are incorporated herein by reference.

BACKGROUND

Japanese Unexamined Patent Application No. 2017-65949 discloses a method for manufacturing an optical fiber. This method for manufacturing an optical fiber includes applying an ultraviolet curable resin to an optical fiber bare wire to obtain an optical fiber, and then irradiating the optical fiber with ultraviolet light using a semiconductor luminescent element. An ultraviolet LED is used as the semiconductor luminescent element.

SUMMARY

A method for manufacturing an optical fiber according to an aspect of the present disclosure is a method for manufacturing an optical fiber including a glass fiber and a primary resin layer coating an outer periphery of the glass fiber, the method comprising: applying an ultraviolet curable resin composition to be the primary resin layer, the resin composition including a photoinitiator; and forming the primary resin layer by curing the resin composition by ultraviolet irradiation reactor(s), wherein a number N of the ultraviolet irradiation reactor(s), a ratio of normalized output φ for each of the ultraviolet irradiation reactor(s), and an irradiation time t (sec) of each of the ultraviolet irradiation reactor(s) in the forming of the primary resin layer satisfy $$6.00 \times 10^{-5} \leq N^* \varphi^* t \leq 2.88 \times 10^{-1}$$

wherein a concentration C [mass %] of the photoinitiator in the forming of the primary resin layer is in accordance with formula (1) represented by an initial concentration C0 [mass %] of the photoinitiator, a linear velocity v [m/s] of the glass fiber, an irradiation length l [m] for each of the ultraviolet irradiation reactor(s), a non-irradiation length L [m] between the ultraviolet irradiation reactor(s), an initiation reaction rate constant k [1/(mass %·sec)], a dark reaction rate constant kD [1/(mass %·sec)], and a reverse reaction rate constant kR [1/(mass %·sec)]:

$$C = C0 * \exp\left(-N * \varphi * \frac{l}{v} * k\right) * \exp\left(-N * \varphi * \frac{L}{v} * kD\right) + C0 * \left(1 - \exp\left(-\varphi * \frac{lk + LkD}{v}\right)\right) * \left(1 - \left(1 + N * \frac{l}{v} * 4kR * C0 * \left(1 - \exp\left(-\varphi * \frac{lk + LkD}{v}\right)\right)\right)^{-1}\right)$$ (1)

wherein the initiation reaction rate constant k is from 20 to 100, wherein the dark reaction rate constant kD is $0 \leq kD \leq 30$, and wherein the reverse reaction rate constant kR is $0 \leq kR \leq 10$. It should be noted that the ratio of normalized output φ is a set value that takes a value of from 0 to 1 ($0 \leq \varphi \leq 1$).

DETAILED DESCRIPTION

Figure 1:
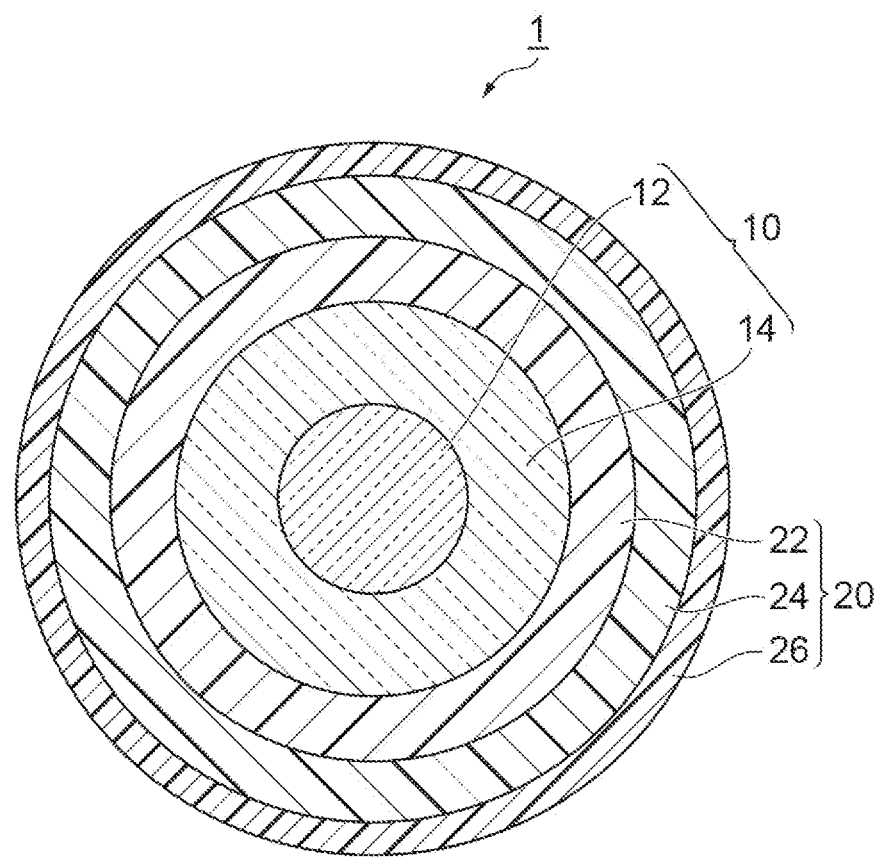
FIG. 1 is a drawing illustrating a cross-section perpendicular to an axial direction of an optical fiber according to an embodiment.

Problems to be Solved by the Present Disclosure

Insufficient ultraviolet irradiation in a forming step of a primary resin layer when manufacturing an optical fiber may cause the primary resin layer to undergo post-cure by subsequent steps. This may increase the Young's modulus of the primary resin layer and increase the micro-bending loss of the optical fiber. However, excessive ultraviolet irradiation in the forming step of the primary resin layer may cause the primary resin layer to adhere to the glass fiber due to overcuring and reduce coating removability. The coating of an optical fiber may be removed for tests in construction sites, etc., so that it is necessary to ensure removability.

It is an object of the present disclosure to provide a method for manufacturing an optical fiber that is capable of suppressing micro-bending loss and ensuring coating removability.

Advantageous Effects of the Present Disclosure

The present disclosure is capable of providing a method for manufacturing an optical fiber that is capable of suppressing micro-bending loss and ensuring coating removability.

Description of Embodiments of the Present Disclosure

Embodiments of the present disclosure will first be listed and described. (1) A method for manufacturing an optical fiber according to an aspect of the present disclosure is a method for manufacturing an optical fiber including a glass fiber and a primary resin layer coating an outer periphery of the glass fiber, the method comprising: applying an ultraviolet curable resin composition to be the primary resin layer, the resin composition including a photoinitiator; and forming the primary resin layer by curing the resin composition by ultraviolet irradiation reactor(s), wherein a number N of the ultraviolet irradiation reactor(s), a ratio of normalized output φ for each of the ultraviolet irradiation reactor (s), and an irradiation time t (sec) of each of the ultraviolet irradiation reactor(s) in the forming of the primary resin layer satisfy $$6.00 \times 10^{-5} \leq N^* \varphi^* t \leq 2.88 \times 10^{-1}$$

wherein a concentration C [mass %] of the photoinitiator in the forming of the primary resin layer is in accordance with formula (1) represented by an initial concentration C0 [mass %] of the photoinitiator, a linear velocity v [m/s] of the glass fiber, an irradiation length l [m] for each of the ultraviolet irradiation reactor(s), a non-irradiation length L [m] between the ultraviolet irradiation reactor(s), an initiation reaction rate constant k [1/(mass %·sec)], a dark reaction rate constant kD [1/(mass %·sec)], and a reverse reaction rate constant kR [1/(mass %·sec)]:

$$C = C0 * \exp\left(-N * \varphi * \frac{l}{v} * k\right) * \exp\left(-N * \varphi * \frac{L}{v} * kD\right) + \qquad (1)$$
$$C0 * \left(1 - \exp\left(-\varphi * \frac{lk + LkD}{v}\right)\right) *$$
$$\left(1 - \left(1 + N * \frac{l}{v} * 4kR * C0 * \left(1 - \exp\left(-\varphi * \frac{lk + LkD}{v}\right)\right)\right)^{-1}\right)$$

wherein the initiation reaction rate constant k is from 20 to 100, wherein the dark reaction rate constant kD is 0≤kD≤30, and wherein the reverse reaction rate constant kR is 0≤kR≤10. It should be noted that the ratio of normalized output φ is a set value that takes a value of from 0 to 1 (0≤φ≤1).

This optical fiber is capable of suppressing micro-bending loss and ensuring coating removability.

(2) In (1) above, the initiation reaction rate constant k may be from 30 to 90. In this case, the coating removability is reliably ensured.

(3) In (1) or (2) above, the dark reaction rate constant kD may be from 0 to 20. In this case, the coating removability is reliably ensured.

(4) In any one of (1) to (3) above, the reverse reaction rate constant kR may be from 0 to 8. In this case, the removability can be ensured and micro-bending loss can be suppressed by also setting the initiation reaction rate constant k to from 30 to 90.

(5) In any one of (1) to (4) above, a peak wavelength of ultraviolet light emitted from the ultraviolet irradiation reactor(s) may be from 350 nm to 410 nm. In this case, LED that emits ultraviolet light (ultraviolet LED) can be used.

DETAILS OF EMBODIMENTS OF THE PRESENT DISCLOSURE

Specific examples of a method for manufacturing an optical fiber according to this embodiment will be described with reference to the drawings as necessary. It should be noted that the present invention is not limited to these examples, but is defined by the scope of the claims, and is intended to include all modifications within the meaning and scope equivalent to the scope of the claims. In the description below, same reference signs are given to the same elements in the description of the drawings, and redundant description will be omitted.

(Optical Fiber)

FIG. 1 is a drawing illustrating a cross-section perpendicular to an axial direction of an optical fiber according to an embodiment. An optical fiber 1 is compliant with at least one of the ITU-T G.652 standard, the ITU-T G.654 standard, and the ITU-T G.657 standard. Being compliant with the ITU-T G.652 standard means being compliant with at least one of G.652.A, G.652.B, G.652.C, and G.652.D. Being compliant with the ITU-T G.654 standard means being compliant with at least one of G.654.A, G.654.B, G.654.C, G.654.D, and G.654.E. Being compliant with the ITU-T G.657 standard means being compliant with at least one of G.657.A and G.657.B. Optical fiber 1 includes a glass fiber 10, and a coating resin layer 20 provided on an outer periphery of glass fiber 10.

Glass fiber 10 includes a core 12 and a cladding 14. Cladding 14 surrounds core 12. Core 12 and cladding 14 mainly include glass such as quartz glass. For example, quartz glass doped with germanium or pure quartz glass may be used for core 12. Pure quartz glass or quartz glass doped with fluorine may be used for cladding 14. Here, pure quartz glass refers to quartz glass that is substantially free of impurities.

Core 12 has a diameter of from 6.0 µm to 12.0 µm. Cladding 14 has an outer diameter of 125 µm±0.5 µm, that is, from 124.5 µm to 125.5 µm. The outer diameter of cladding 14 matches a diameter of glass fiber 10.

Coating resin layer 20 includes a primary resin layer 22, a secondary resin layer 24, and a colored resin layer 26. Primary resin layer 22 is in contact with an outer peripheral surface of cladding 14, and coats the entire cladding 14. Secondary resin layer 24 is in contact with an outer peripheral surface of primary resin layer 22, and coats the entire primary resin layer 22. Colored resin layer 26 is in contact with an outer peripheral surface of secondary resin layer 24, and coats the entire secondary resin layer 24. Colored resin layer 26 constitutes an outermost layer of coating resin layer 20.

Primary resin layer 22 and secondary resin layer 24 are formed of a cured product of an ultraviolet curable resin composition. This resin composition includes a urethane (meth)acrylate oligomer, a monomer, and a photopolymerization initiator (photoinitiator). Here, the term "(meth) acrylate" refers to the acrylate or the corresponding methacrylate. A monofunctional monomer having a polymerizable group, or a polyfunctional monomer having two or more polymerizable groups may be used as the monomer. Two or more types of monomers may be used as a mixture. The photopolymerization initiator may be selected as appropriate from among publicly known radical photopolymerization initiators. The resin composition may further include a silane coupling agent, a photoacid generator, a leveling agent, an anti-foaming agent, an antioxidant, and the like. Primary resin layer 22 and secondary resin layer 24 do not include a pigment or a dye, and are substantially transparent.

Colored resin layer 26 is formed of a cured product of an ultraviolet curable resin composition including a colored ink (pigment, dye). This resin composition includes, for example, a urethane (meth)acrylate oligomer, a monomer, and a photopolymerization initiator. A monofunctional monomer having a polymerizable group, or a polyfunctional monomer having two or more polymerizable groups may be used as the monomer. Two or more types of monomers may be used as a mixture. The photopolymerization initiator may be selected as appropriate from among publicly known radical photopolymerization initiators. The resin composition may further include a silane coupling agent, a photoacid generator, a leveling agent, an anti-foaming agent, an antioxidant, and the like. Optical fiber 1 includes colored resin layer 26, and is thus a so-called optical fiber colored core wire.

Primary resin layer 22, for example, has a thickness of from 7.5 µm to 36.5 µm. Secondary resin layer 24, for example, has a thickness of from 10 µm to 40 µm. Colored resin layer 16, for example, has a thickness of from 3 µm to 10 µm.

Primary resin layer 22 has a Young's modulus at 23° C. of from 0.05 MPa to 0.60 MPa. Secondary resin layer 24 has a Young's modulus at 23° C. of from 800 MPa to 2800 MPa. Colored resin layer 26 has a Young's modulus at 23° C. of from 1000 MPa to 1500 MPa.

(Method for Manufacturing Optical Fiber)

A method for manufacturing optical fiber 1 according to this embodiment includes a drawing step, a first applying step, a first forming step, a second applying step, a second forming step, a third applying step, and a third forming step. Optical fiber 1 is manufactured through these steps. Each of these steps will be described below.

The drawing step is a step of drawing glass fiber 10 from an optical fiber preform. For example, an optical fiber preform having synthetic quartz as its main component may be used. The optical fiber preform is heated, melted, and extended by an optical fiber drawing machine.

The first applying step is a step of applying an ultraviolet curable resin composition (first resin composition) to be a primary resin layer. The first resin composition is applied to an outer peripheral surface of glass fiber 10. For example, a dice may be used as an application device for applying the first resin composition.

The first forming step is a step of forming primary resin layer 22 by curing the first resin composition by irradiation with ultraviolet light. In the first forming step, the first resin composition is irradiated with ultraviolet light using an ultraviolet irradiation reactor. A peak wavelength (wavelength at which the ratio of normalized output is the greatest) of the ultraviolet light that the first resin composition is irradiated with by the ultraviolet irradiation reactor is from 350 nm to 410 nm. The ultraviolet irradiation reactor includes a plurality of ultraviolet LEDs as a light source. The plurality of ultraviolet LEDs are, for example, disposed radially around glass fiber 10. The first forming step is performed at least after the first applying step. An ultraviolet irradiation condition of the first forming step is set such that a number N of the ultraviolet irradiation reactors, the ratio of normalized output φ for each of the ultraviolet irradiation reactors, and an irradiation time t (sec) of each of the ultraviolet irradiation reactors satisfy $$6.00 \times 10^{-5} \le N^* \varphi^* t \le 2.88 \times 10^{-1}.$$

It should be noted that the ratio of normalized output φ is a set value that takes a value of from 0 to 1 ($0 \le \varphi \le 1$).

The second applying step is a step of applying an ultraviolet curable resin composition (second resin composition) to be a secondary resin layer. The second applying step is performed at least after the first applying step. The second applying step may be performed before the first forming step, or after the first forming step. In the case in which the second applying step is performed before the first forming step, the second resin composition is applied to an outer peripheral surface of the first resin composition (wet-on-wet method). In the case in which the second applying step is performed after the first forming step, the second resin composition is applied to the outer peripheral surface of primary resin layer 22 (wet-on-dry method). For example, a dice may be used as an application device for applying the second resin composition.

The second forming step is a step of forming secondary resin layer 24 by curing the second resin composition by irradiation with ultraviolet light. In the second forming step, the second resin composition is irradiated with ultraviolet light using an ultraviolet irradiation reactor. The ultraviolet irradiation reactor includes a plurality of ultraviolet LEDs as a light source. The plurality of ultraviolet LEDs are, for example, disposed radially around glass fiber 10. In the wet-on-wet method, the first forming step is performed together with the second forming step after the second applying step. In this case, the first forming step and the second forming step are performed substantially as one step. The first resin composition and the second resin composition are cured by irradiating them together with ultraviolet light from the same light source to form primary resin layer 22 and secondary resin layer 24. In the wet-on-dry method, the first forming step and the second forming step are performed separately. The first forming step is performed before the second applying step. The second forming step is performed after the second applying step.

The third applying step is a step of applying an ultraviolet curable resin composition (third resin composition) to be a colored resin layer 26. The third resin composition is applied to the outer peripheral surface of secondary resin layer 24 using a dice. The third applying step is performed after the second forming step.

The third forming step is a step of forming colored resin layer 26 by curing the third resin composition by irradiation with ultraviolet light. In the third forming step, the third resin composition is irradiated with ultraviolet light using an ultraviolet lamp as a light source. A plurality of the light sources are, for example, disposed radially around glass fiber 10. The third forming step is performed after the third applying step.

Optical fiber 1 including glass fiber 10 and coating resin layer 20 is thus manufactured, and wound onto a bobbin. The fiber before being coated with colored resin layer 26 may also be referred to as an "element wire," and the fiber after being coated with colored resin layer 26 may also be referred to as a "core wire." The element wire includes glass fiber 10, primary resin layer 22, and secondary resin layer 24. The core wire is optical fiber 1. In the method for manufacturing optical fiber 1, the element wire may be temporarily wound onto a bobbin after performing the second forming step. In this case, the element wire is drawn from the bobbin, the third applying step and the third forming step are performed, and the core wire is wound onto another bobbin.

(Analysis of Curing Reaction)

Insufficient ultraviolet irradiation in the first forming step may cause primary resin layer 22 to undergo post-cure by the second forming step and the third forming step. This may increase the Young's modulus of primary resin layer 22 and increase the micro-bending loss of optical fiber 1. However, excessive ultraviolet irradiation in the first forming step may cause primary resin layer 22 to adhere to glass fiber 10 due to overcuring and reduce the removability of coating resin layer 20. Consequently, a photoinitiator residue prediction model based on chemical kinetics was prepared and studied to systematically determine conditions for the first forming step that is capable of suppressing micro-bending loss and ensuring the removability of coating resin layer 20.

The assumed curing reaction mechanism of the ultraviolet curable resin in the modeling is as shown below, and the reactions were broken down into three types and examined. Here, PI is a photopolymerization initiator, R· is a radical molecule, hv is ultraviolet light, k is an initiation reaction rate constant, and kD is a dark reaction rate constant.

$$\text{Initiation reaction} \quad PI + hv \xrightarrow{k} 2R\bullet$$

-continued $$\text{Dark reaction} \quad PI + (h\nu) \overset{kD}{\to} 2R\bullet$$

$$\text{Reverse reaction} \quad 2R\bullet \overset{kR}{\to} PI$$

The number of photons of ultraviolet light is largely excessive relative to the number of molecules of a photo-polymerization initiator during curing of a normal ultraviolet curable resin. It was thus assumed that the initiation reaction is a pseudo-first-order reaction. The degree of cure of an ultraviolet curable resin is affected not only by the total ultraviolet dose (UV dose) during the initiation reaction, but also by the ratio of normalized output for each of the ultraviolet irradiation reactors and the non-irradiation times between the ultraviolet irradiation reactors (intermittent irradiation). The ratio of normalized output for each of the ultraviolet irradiation reactors and the impact of intermittent irradiation were incorporated this time as dark reaction and reverse reaction.

A concentration C [mass %] of the photoinitiator in the first forming step is represented by formula (2):

$$C = Cin \times CD + CR \tag{2}$$

where Cin is a term representing initiation reaction, CD is a term representing dark reaction, and CR is a term representing reverse reaction.

Each of the terms Cin, CD, CR is represented by formulas (3) to (5) below. Here, C0 is an initial concentration [mass %] of the photoinitiator, $\nu$ is a linear velocity [m/s] of glass fiber 10, l is an irradiation length [m] for each of the ultraviolet irradiation reactors, L is a non-irradiation length [m] between the ultraviolet irradiation reactors, N is the number of the ultraviolet irradiation reactors, p is the ratio of normalized output for each of the ultraviolet irradiation reactors, and t is the irradiation time [sec] of each of the ultraviolet irradiation reactors.

$$Cin = C0 * \exp\left(-N * \varphi * \frac{l}{\nu} * k\right) \tag{3}$$

$$CD = \exp\left(-N * \varphi * \frac{L}{\nu} * kD\right) \tag{4}$$

$$CR = C0 * \left(1 - \exp\left(-\varphi * \frac{lk + LkD}{\nu}\right)\right) * \tag{5}$$

-continued $$\left(1 - \left(1 + N * \frac{l}{\nu} * 4kR * C0 * \left(1 - \exp\left(-\varphi * \frac{lk + LkD}{\nu}\right)\right)\right)^{-1}\right)$$

Formula (1) below is obtained by replacing each of the terms Cin, CD, CR in formula (2) with formulas (3) to (5). Concentration C of the photoinitiator in the first forming step is in accordance with formula (1).

$$C = C0 * \exp\left(-N * \varphi * \frac{l}{\nu} * k\right) * \exp\left(-N * \varphi * \frac{L}{\nu} * kD\right) + \tag{1}$$
$$C0 * \left(1 - \exp\left(-\varphi * \frac{lk + LkD}{\nu}\right)\right) *$$
$$\left(1 - \left(1 + N * \frac{l}{\nu} * 4kR * C0 * \left(1 - \exp\left(-\varphi * \frac{lk + LkD}{\nu}\right)\right)\right)^{-1}\right)$$

The ranges of reaction rate constants k, kD, and kR were determined by fitting the calculated value of C obtained from formula (1) to the measured value of C. That is, initiation reaction rate constant k [1/(mass %·sec)] is from 20 to 100, may be from 30 to 90, and may be 66 as an example. Dark reaction rate constant kD [1/(mass % sec)] is $0 \leq kD \leq 30$, may be from 0 to 20, and may be 0 as an example. Reverse reaction rate constant kR [1/(mass %·sec)] is $0 \leq kR \leq 10$, may be from 0 to 8, and may be 0 as an example. Optimizing the parameters $\varphi$, N, $\nu$, l, L relative to the photoinitiator residue that is required thus enables the removability of primary resin layer 22 to be ensured and the micro-bending loss to be suppressed.

Figure 2:
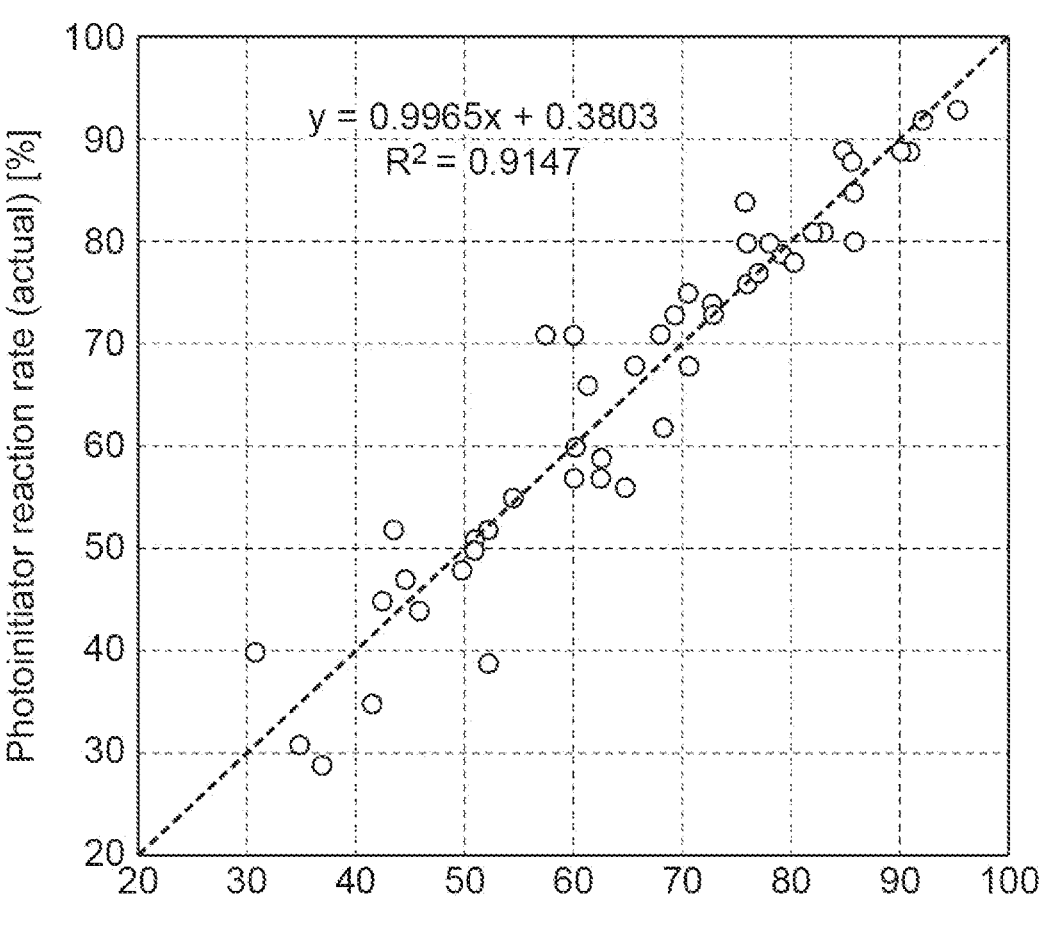
FIG. 2 is a graph illustrating the relationship between actual measurement values and predicted values of a reaction rate of a photoinitiator.

Substituting various conditions into formula (1) enables the residual concentration (reaction rate) to be predicted in advance. FIG. 2 is a graph illustrating the relationship between actual measurement values and predicted values (calculated values) of the reaction rate of the photoinitiator. As illustrated in FIG. 2, results of simulations using the model above show very good agreement with actual events. The photoinitiator reaction rate illustrated in the graph is given by the following formula:

$$100(C0-C)/C0.$$

EXAMPLES

Optical fibers of Samples 1 to 12 were manufactured as Examples by changing the type of the ultraviolet curable resin of the primary resin layer, and the removability of the primary resin layer and micro-bending were evaluated. Table 1 shows the evaluation results.

TABLE 1

| Sample | 1 | 2 | 3 | 4 | 5 | 6 | 7 | 8 | 9 | 10 | 11 | 12 |
|---|---|---|---|---|---|---|---|---|---|---|---|---|
| Resin | A | B | C | D | E | F | G | H | I | J | K | L |
| k | 16 | 20 | 30 | 38 | 50 | 66 | 79 | 90 | 93 | 93 | 100 | 107 |
| kD | 0 | 0 | 0 | 13 | 19 | 0 | 18 | 5 | 28 | 38 | 30 | 32 |
| kR | 0 | 0 | 0 | 1 | 5 | 0 | 8 | 7 | 13 | 1 | 10 | 4 |
| Removability | good | very good | very good | very good | very good | very good | very good | very good | good | poor | good | poor |
| ΔPOM | poor | good | very good | very good | very good | very good | very good | very good | poor | good | good | good |

Resins A to L were used for Samples 1 to 12, respectively. The second applying step was performed by the wet-on-wet method. Reaction constants k, kD, kR shown in Table 1 are values that were experimentally obtained.

The removability was evaluated as shown below. Firstly, the coating resin layer of the optical fiber was removed using a fiber stripper, and the presence or absence of residue was checked. Secondly, the surface of the exposed glass fiber was wiped with alcohol once, and the presence or absence of residue was checked again. Cases in which there was no residue when the coating was removed are indicated "very good," cases in which there was no residue when wiped with alcohol once are indicated "good," and cases in which residue was present when wiped with alcohol once are indicated "poor."

Micro-bending was evaluated by the amount of change (ΔPOM) in the Young's modulus of the primary resin layer. It was evaluated that the smaller the amount of change in the Young's modulus of the primary resin layer, the less the transmission loss due to micro-bending. Specifically, the Young's modulus of the primary resin layer was measured by the Pullout Modulus (POM) method at 23° C. using an element wire before forming the colored resin layer and a core wire after forming the colored resin layer, and the difference therebetween was taken as ΔPOM. In Table 1, cases in which ΔPOM was 40% or less are indicated "very good," cases in which ΔPOM was over 40% and 50% or less are indicated "good," and cases in which ΔPOM was over 50% are indicated "poor."

In the POM method, the element wire or the core wire was fixed with chuck devices at two points, and the portion of the coating resin layer between the two chuck devices was removed. Here, the portion of the coating resin layer refers to the primary resin layer and the secondary resin layer in the case of the element wire, and refers to the primary resin layer, the secondary resin layer, and the colored resin layer in the case of the core wire. One of the chuck devices was then fixed, and the other chuck device was gently moved in the direction away from the fixed chuck device. The Young's modulus of the primary resin layer was obtained by the following formula:

$$\text{Young's modulus [MPa]}=((1+n)W/\pi LZ)\times\ln(Dp/Df)$$

where L is a length of the portion of the element wire or the core wire between the chuck devices, Z is an amount of movement of the chuck, Dp is an outer diameter of the primary resin layer, Df is an outer diameter of the glass fiber, n is a Poisson's ratio of the primary resin layer, and W is a load during movement of the chuck device.

Samples 2 to 8 and 11 correspond to the Examples, with the removability and micro-bending being either "very good" or "good." Samples 1, 9, 10, and 12 correspond to Comparative Examples, with the removability or ΔPOM being "poor." Initiation reaction rate constant k was less than 20 in Sample 1 and reverse reaction rate constant kR was over 10 in Sample 9, so that it was considered that much of the initiator remained in the first forming step (drawing step), causing the degree of cure to be insufficient and ΔPOM to exceed 50%. Dark reaction rate constant kR was over 30 in Sample 10, and initiation reaction rate constant k was over 100 and dark reaction rate constant kD was over 30 in Sample 12, so that it was considered that they were both overcured and the removability was reduced.

Although the embodiments have been described, the present disclosure is not necessarily limited to the embodiments and variations described above, and various modifications are possible without departing from the gist thereof.

What is claimed is:

1. A method for manufacturing an optical fiber including a glass fiber and a primary resin layer coating an outer periphery of the glass fiber, the method comprising:

applying an ultraviolet curable resin composition to be the primary resin layer, the resin composition including a photoinitiator; and forming the primary resin layer by curing the resin composition by ultraviolet irradiation reactor(s), wherein a number N of the ultraviolet irradiation reactor(s), a ratio of normalized output φ for each of the ultraviolet irradiation reactor(s), and an irradiation time t (sec) of each of the ultraviolet irradiation reactor(s) in the forming of the primary resin layer satisfy $$6.00\times10^{-5}\leq N*\varphi*t\leq2.88\times10^{-1}$$

wherein a concentration C [mass %] of the photoinitiator in the forming of the primary resin layer is in accordance with formula (1) represented by an initial concentration C0 [mass %] of the photoinitiator, a linear velocity v [m/s] of the glass fiber, an irradiation length l [in] for each of the ultraviolet irradiation reactor(s), a non-irradiation length L [m] between the ultraviolet irradiation reactor(s), an initiation reaction rate constant k [1/(mass %·sec)], a dark reaction rate constant kD [1/(mass %·sec)], and a reverse reaction rate constant kR [1/(mass %·sec)]:

$$C = C0*\exp\left(-N*\varphi*\frac{l}{v}*k\right)*\exp\left(-N*\varphi*\frac{L}{v}*kD\right)+ \tag{1}$$
$$C0*\left(1-\exp\left(-\varphi*\frac{lk+LkD}{v}\right)\right)*$$
$$\left(1-\left(1+N*\frac{l}{v}*4kR*C0*\left(1-\exp\left(-\varphi*\frac{lk+LkD}{v}\right)\right)\right)^{-1}\right)$$

wherein the initiation reaction rate constant k is from 20 to 100, wherein the dark reaction rate constant kD is 0≤kD≤30, and wherein the reverse reaction rate constant kR is 0≤kR≤10.

2. The method for manufacturing an optical fiber according to claim 1, wherein the initiation reaction rate constant k is from 30 to 90.

3. The method for manufacturing an optical fiber according to claim 1, wherein the dark reaction rate constant kD is from 0 to 20.

4. The method for manufacturing an optical fiber according to claim 1, wherein the reverse reaction rate constant kR is from 0 to 8.

5. The method for manufacturing an optical fiber according to claim 1, wherein a peak wavelength of ultraviolet light emitted from the ultraviolet irradiation reactor(s) is from 350 nm to 410 nm.

6. The method for manufacturing an optical fiber according to claim 1, wherein the primary resin layer has a Young's modulus at 23° C. of from 0.05 MPa to 0.60 MPa.

7. The method for manufacturing an optical fiber according to claim 1, wherein the optical fiber is compliant with at least one of the ITU-T G.652 standard, the ITU-T G.654 standard, and the ITU-T G.657 standard.

8. The method for manufacturing an optical fiber according to claim 1, wherein the glass fiber has an outer diameter of 125 μm±0.5 μm.

9. The method for manufacturing an optical fiber according to claim 1, wherein each of the ultraviolet irradiation reactor(s) includes a plurality of ultraviolet LEDs as a light source.

10. The method for manufacturing an optical fiber according to claim 9, wherein the plurality of ultraviolet LEDs are disposed radially around the glass fiber.

\* \* \* \* \*